US00RE36101E

United States Patent [19]

Andres et al.

[11] E Patent Number: Re. 36,101

[45] Reissued Date of Patent: Feb. 16, 1999

[54] AIR CYCLE MACHINE WITH MAGNETIC BEARINGS

[75] Inventors: Michael Andres, Rockford, Ill.; Terry L. Coons, Dayton, Ohio

[73] Assignee: Barber-Colman Company, Rockford, Ill.

[21] Appl. No.: 488,578

[22] Filed: Jun. 8, 1995

Related U.S. Patent Documents

Reissue of:

[64] Patent No.: 5,310,311
Issued: May 10, 1994
Appl. No.: 961,002
Filed: Oct. 14, 1992

[51] Int. Cl.[6] ..... F01D 25/16

[52] U.S. Cl. ..... 415/229; 415/214.1; 310/90.5

[58] Field of Search ..... 415/14, 129, 131, 415/213.1, 214.1, 229; 417/407; 310/90.5

[56] References Cited

U.S. PATENT DOCUMENTS

| | | | |
|---|---|---|---|
| 3,565,495 | 2/1971 | Lyman | 308/10 |
| 3,694,041 | 9/1972 | Studer | 308/10 |
| 3,702,028 | 11/1972 | Habermann et al. | 308/10 |
| 4,012,083 | 3/1977 | Habermann et al. | 308/10 |
| 4,137,006 | 1/1979 | Becker | 415/214.1 |
| 4,180,946 | 1/1980 | Heijkenskjold et al. | 51/134.5 |
| 4,245,869 | 1/1981 | Scheffer et al. | 308/10 |
| 4,473,259 | 9/1984 | Goldowsky | 308/10 |
| 4,541,786 | 9/1985 | McLean | 415/229 |
| 4,583,794 | 4/1986 | Takahara et al. | 310/90.5 |
| 4,885,491 | 12/1989 | Hiyama et al. | 310/90.5 |
| 4,928,561 | 5/1990 | Fouche | 310/90.5 |
| 5,021,697 | 6/1991 | Kralick | 310/90.5 |
| 5,027,280 | 6/1991 | Ando et al. | 310/90.5 |
| 5,113,670 | 5/1992 | McAuliffe et al. | 62/402 |
| 5,142,175 | 8/1992 | Watanabe | 310/90.5 |

FOREIGN PATENT DOCUMENTS

| | | | |
|---|---|---|---|
| 0388147 | 9/1990 | European Pat. Off. | 310/90.5 |
| 0154516 | 9/1982 | Japan | 310/90.5 |

OTHER PUBLICATIONS

Six-page brochure published Jan. 1988 by Magnetic Bearings, Inc., Radford, Virginia.

One-page article on magnetic bearings,, published by Magnetic Bearings, Inc., Radford, Virginia, publication dated unknown.

*Primary Examiner*—Christopher Verdier

*Attorney, Agent, or Firm*—Leydig, Voit & Mayer, Ltd.

[57] ABSTRACT

An air cycle machine for producing a supply of cooled air and including a compressor rotor fixed to a shaft which is driven by a turbine rotor, the turbine serving to expand air which is pressurized by the compressor. Magnetic bearings support the shaft radially in a housing for rotation about a precisely established axis while a magnetic thrust bearing keeps the shaft in a precisely fixed axial position. The housing and the bearings are constructed as two split sections to permit the housing and the bearings to be separated radially and facilitate repair and/or replacement of the shaft and other internal components.

10 Claims, 5 Drawing Sheets

AIR CYCLE MACHINE WITH MAGNETIC BEARINGS

Matter enclosed in heavy brackets [ ] appears in the original patent but forms no part of this reissue specification; matter printed in italics indicates the additions made by reissue.

BACKGROUND OF THE INVENTION

Environmental control systems for aircraft typically employ air cycle machines to cool and condition pressurized air supplied by the engines or by an auxiliary power unit. In an air cycle machine, a shaft is rotatably supported in a housing and serves to connect a compressor and a turbine. The pressurized supply air passes first to the compressor where it is compressed and is heated as a result of the compression. After being cooled by a heat exchanger, the compressed air is expanded in the turbine and is chilled to a very low temperature in order to cool the aircraft cabin and the aircraft avionics. The compressed air acting on the turbine rotates the shaft which, in turn, drives the compressor.

To support the shaft which connects the compressor and the turbine, an air cycle machine typically employs three bearings. Two of the bearings are radial bearings which prevent the shaft from shifting radially. The third bearing is a thrust bearing which holds the shaft in a fixed axial position. For optimum performance, very small clearances must be maintained between the machine housing and the tips of the compressor and turbine blades. If the bearings permit more than just slight amounts of free play, the shaft will shift when loaded and will allow the blade tips to contact the encircling housing.

In prior air cycle machines, hydrodynamic fluid film bearings (commonly called air bearings) have been used to locate the shaft radially and axially since such bearings provide minimal free play. Air bearings, however, require extremely small clearances (e.g., ±0.0002"), require supply air for cooling, and are slightly damaged at each start up and shut down as a result of lack of support at low speeds. Because of the small clearance in the air bearings, dirt or other combination increases the susceptibility for damage and, in addition, such clearances result in relatively high friction and heat. As a result, bearing replacement is a frequent cost item and, if failure occurs during operation, the compressor and/or turbine may be damaged. A shaft which is supported by air bearings must be removed axially from the housing for repair or replacement and this usually requires that the air cycle machine be removed from the aircraft and sent to a remote repair depot.

Magnetic bearings are used for supporting shafts in various types of machinery. In radial magnetic bearings, several electromagnets are spaced angularly around a shaft and, when energized, produce opposing magnetic forces which cause the shaft to levitate in free space within the housing. Sensors detect the actual position of the shaft and vary the energization of the electromagnets in such a manner as to keep the shaft centered precisely on a predetermined axis.

While the initial cost of a magnetic bearing system may be somewhat higher than that of an air bearing system, magnetic bearings permit more easily attainable machining tolerances (e.g., ±0001") and larger clearances, require no air for cooling, experience a relatively long service life, and are capable of supporting shafts either at rest or operating at speeds of 100,000 RPM or higher.

SUMMARY OF THE INVENTION

The general aim of the present invention is to provide a new and improved air cycle machine which utilizes magnetic bearings to precisely support the compressor/turbine shaft for rotation at high speeds in a high vibration, high shock and high temperature environment such as typically exists in a jet aircraft.

A further object of the invention is to provide an air cycle machine having magnetic bearings and a housing which are uniquely assembled as a clamshell structure permitting relatively quick and easy removal of the shaft from the bearings and the housing for purposes of repairing or replacing the shaft and/or other components of the air cycle machine.

The invention also resides in the use of magnetic force for biasing the shaft axially in opposition to the force created by the pressure differentials between the compressor and the turbine of the air cycle machine.

These and other objects and advantages of the invention will become more apparent from the following detailed description when taken in conjunction with the accompanying drawings.

DETAILED DESCRIPTION OF THE PREFERRED EMBODIMENT

Figure 1:
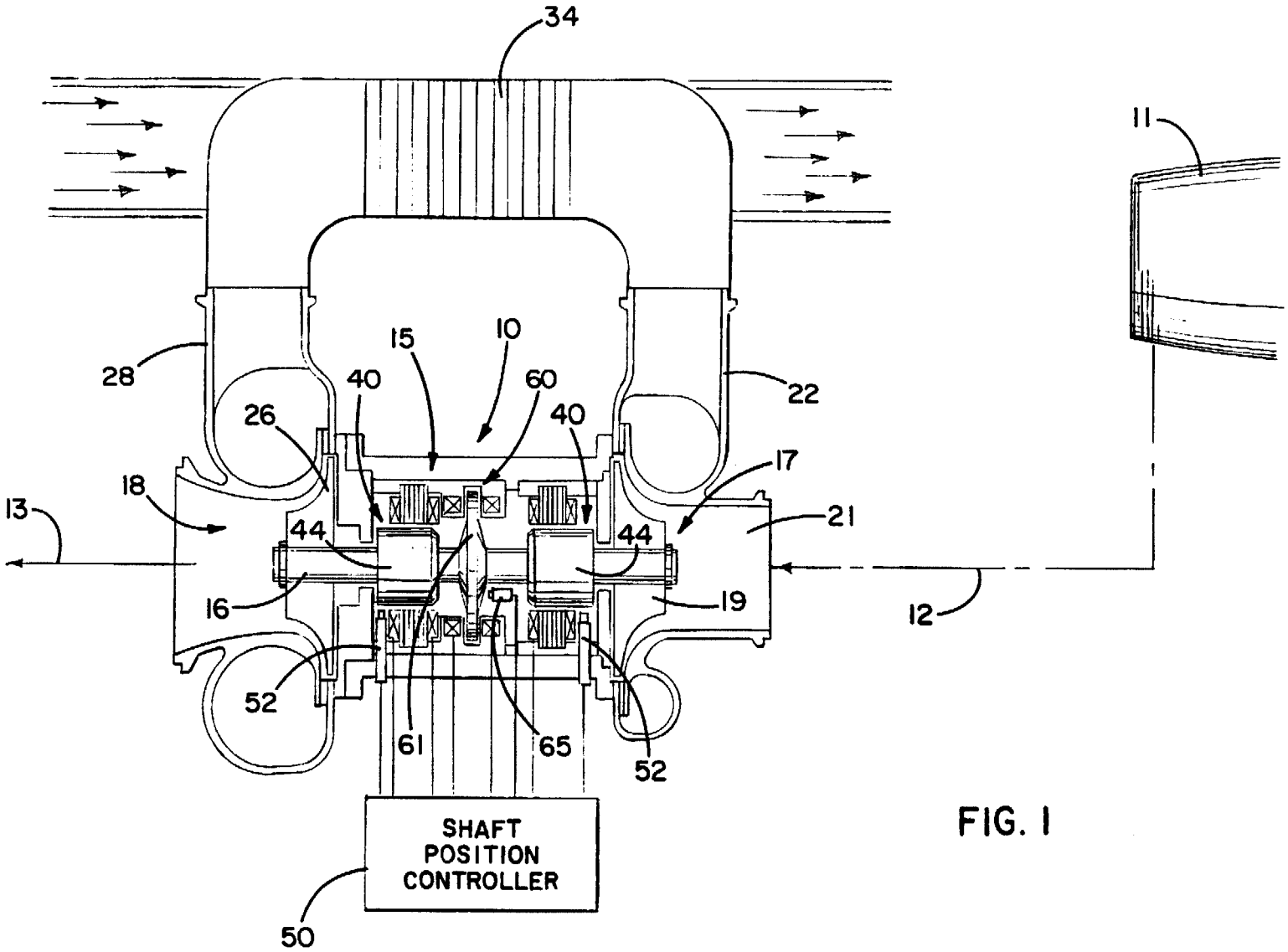
FIG. 1 is a diagrammatic view showing the major components of an air cycle machine of the invention in a typical aircraft environment.

For purposes of illustration, the invention has been shown in the drawings as incorporated in an air cycle machine 10 for use in an aircraft propelled by an engine 11 such as a gas turbine. The air cycle machine 10 receives hot pressurized bleed air from the engine 11 via a line 12 and discharges chilled air (e.g., air at −10° F.) through a line 13. The chilled air from the line 13 may be further processed and may be used for cooling both the cabin and the avionics of the aircraft.

Figure 2:
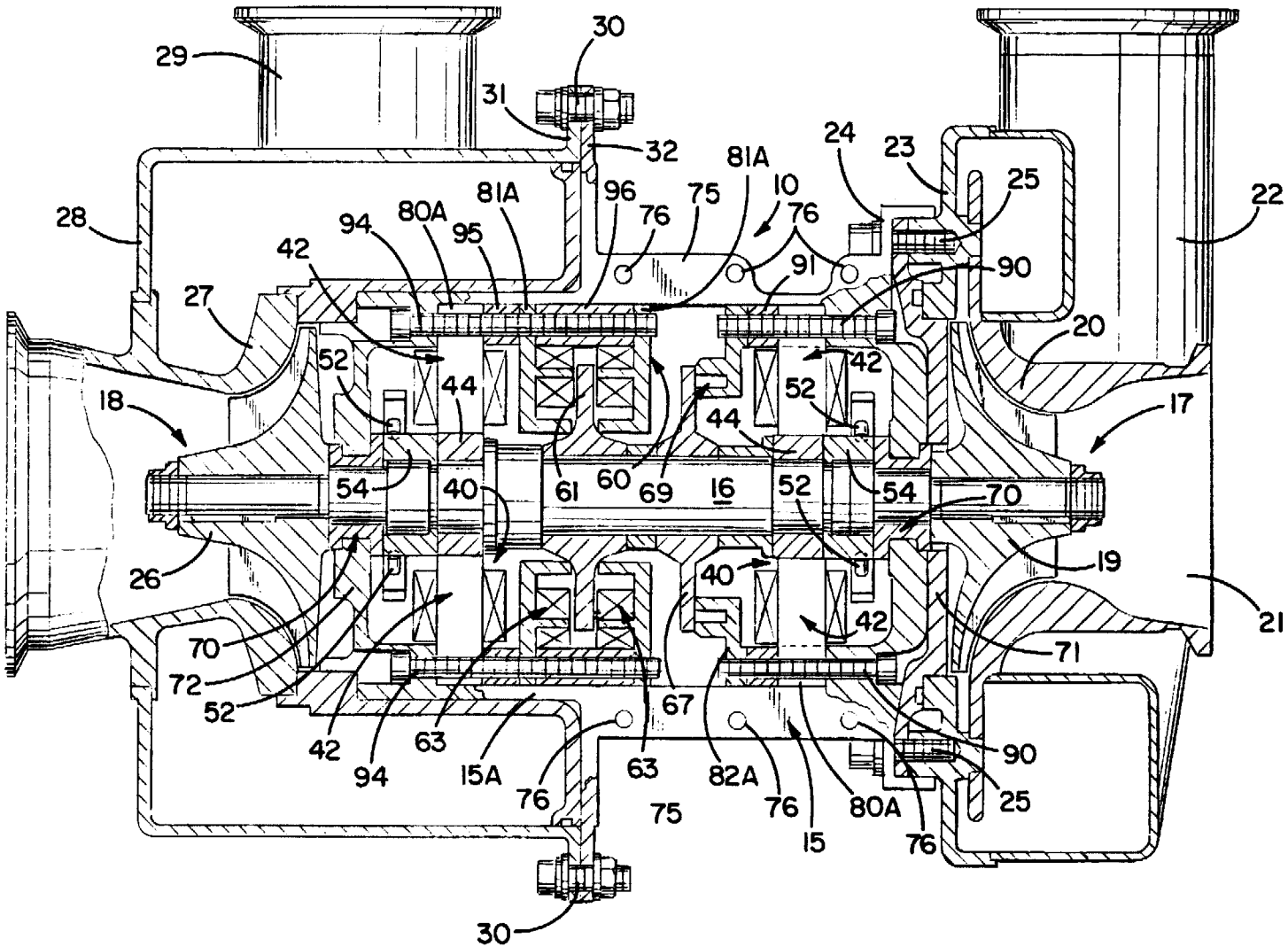
FIG. 2 is a side elevational view of the air cycle machine with certain parts being broken away and shown in section.

In general, the air cycle machine includes a housing 15, a shaft 16 rotatably supported in the housing, a compressor 17 at one end of the housing and a turbine 18 at the opposite end of the housing. The compressor includes a bladed rotor 19 (FIG. 2) secured to one end portion of the shaft and rotatable within a stator 20 having an inlet 21 and secured within a scroll or casing 22, the inlet 21 communicating with the line 12 and receiving bleed air from the engine 11. The casing 22 includes a mounting flange 23 which is secured to an annular mounting flange 24 at the adjacent end of the housing 15 by angularly spaced and axially extending screws 25.

Similarly, the turbine 18 includes a bladed rotor 26 secured to the opposite end portion of the shaft 16 and rotatable within a stator 27. An inlet plenum or casing 28 is associated with the stator and includes an inlet 29 for admitting pressurized air to the stator. Angularly spaced and axially extending screws 30 secure a mounting flange 31 on the casing 28 to an annular mounting flange 32 projecting radially from the housing 15 about midway between the ends thereof. Bleed air from the line 12 is compressed and heated by the compressor 17 and is discharged through an outlet of the casing 22 to a heat exchanger 34 (FIG. 1) having an outlet communicating with the inlet of the turbine 18. Herein, the heat exchanger is of the ram air type in that an airstream created by forward movement of the aircraft sweeps through the heat exchanger and cools the hot compressed air delivered to the heat exchanger by the compressor 17. The pressurized air from the heat exchanger then flows to and is expanded in the turbine 18. This not only produces the power necessary to drive the compressor rotor 19 via the shaft 16 but also produces a flow of chilled air through the line 13 for use in cooling the aircraft cabin and avionics. Herein, the shaft is rotated at about 90,000 RPM but may be rotated at speeds well in excess of 100,000 RPM.

To enable the rotors 19 and 26 to rotate within the stators 20 and 27 at high speed and with small clearance, it is necessary that the shaft 16 be supported within the housing 15 to rotate constantly about a precise horizontal axis in spite of load fluctuations on the shaft and in spite of severe vibration, high shock loads and high temperatures which may be imposed on the air cycle machine 10 during operation of the aircraft. In accordance with the present invention, magnetic bearings are utilized to cause the shaft 16 to levitate in free space within the housing 15 and to keep the shaft rotating about a precisely established axis under all load and temperature conditions. The magnetic bearings are far more durable than mechanical bearings and, as will be explained subsequently, provide several advantages over air bearings of the type conventionally used in air cycle machines.

More specifically, two axially spaced magnetic bearings 40 are located in encircling relation with the shaft 16 between the compressor 17 and the turbine 18 and serve to support the shaft radially within the housing 15. The two radial bearings are identical and thus only one need be described. In general terms, it comprises a plurality of electromagnets 42 supported by the housing 15 and spaced equally around a collar 44 fixed to the shaft and made of a material having high magnetic saturation. The number of electromagnets employed may vary but typically eight electromagnets are spaced around the collar. The electromagnets are arranged in pairs with the two electromagnets of each pair being of opposite polarity and with adjacent electromagnets of adjacent pairs being of the same polarity.

Figure 5:
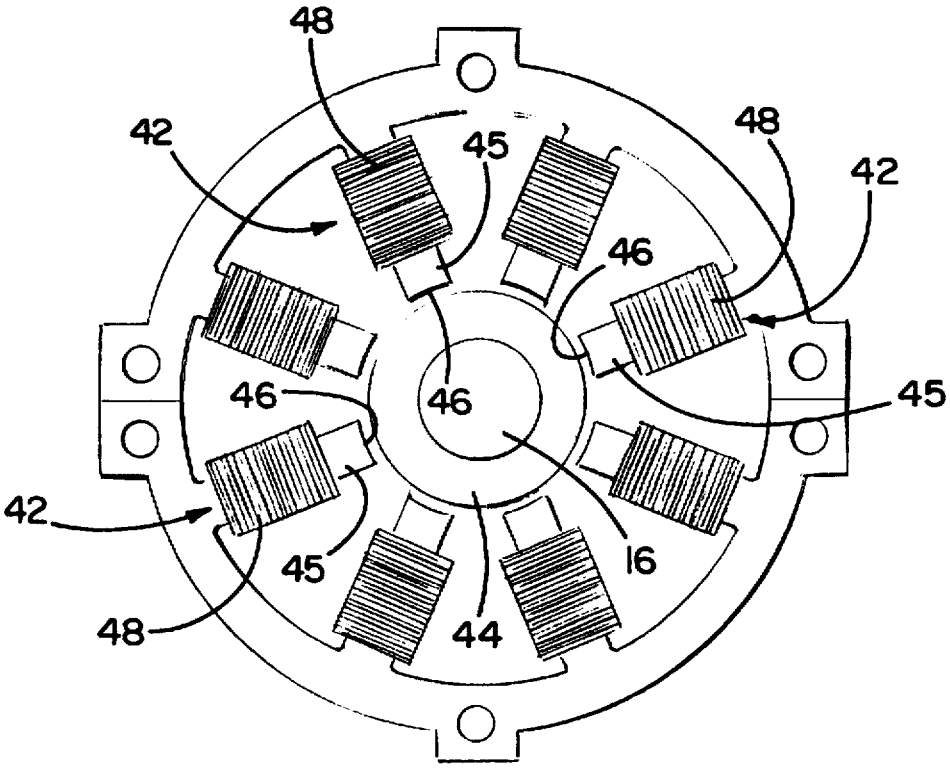
FIG. 5 is a diagrammatic view of one of the radial magnetic bearings.

The electromagnets 42 for each bearing 40 are illustrated schematically in FIG. 5. As shown, each electromagnet comprises a core 45 defining a pole piece and having an arcuate pole face 46 concentric with the collar 44 and spaced therefrom by a narrow radial air gap of approximately 0.010". An electrical coil 48 is wound around each core and is adapted to be energized by way of a shaft position controller 50 shown schematically in FIG. 1. Non-contacting position sensors 52 are spaced angularly around a collar 54 adjacent the collar 44 to detect the actual radial position to the shaft 16 and to transmit signals representative of that position to the controller 50. The sensors are supported by mounting brackets 55 in the housing 15, there typically being two sensors for each bearing 40.

When the coils 48 are energized, the electromagnets 42 of the two bearings 40 create magnetic fields which coact with the collars 44 to cause the shaft 16 to levitate out of physical contact with the pole faces 46 of the cores 45. The radial location of the shaft is constantly monitored by the sensors 52 and, if the shaft deviates radially from a precisely established axis, the shaft controller 50 adjusts the current supplied to the electromagnets and causes the shaft to be brought back into its proper position.

Provision is made or a magnetic thrust bearing 60 for keeping the shaft 16 in a predetermined axial position in the housing 15. The thrust bearing 60 is located between the two radial bearings 40 and herein comprises a disc 61 fixed to and projecting radially from the shaft. In addition, the thrust bearing comprises axially spaced and axially opposing electromagnets 63 fixed to the housing 15 and located on opposite sides of the disc. Two electromagnets 63 are positioned on each side of the disc.

In this instance, each electromagnet 63 of the thrust bearing 60 includes a metal core having an annular pole face disposed in opposing relation with the disc 61 and spaced from the disc by a narrow axial air gap of approximately 0.010". An electrical coil is wound around each core and is operable when energized to interact with the disc to produce magnetic flux tending to attract the disc axially toward the respective electromagnet. The coils are adapted to be energized by current supplied by the shaft controller 50. A non-contacting position sensor 65 shown schematically in FIG. 1 also is associated with the thrust controller, detects the actual axial position of the shaft 16 and transmits a signal representative of that position to the controller.

The axially spaced electromagnets 63 of the thrust bearing 60 exert axially opposing magnetic forces on the disc 61 to hold the shaft 16 in a predetermined axial position. If the shaft deviates from that position, the controller 50 responds to the signal from the sensor 65 and adjusts the current supplied to the electromagnets 63 on either or both sides of the disc in order to return the shaft to its proper axial position.

Figure 4:
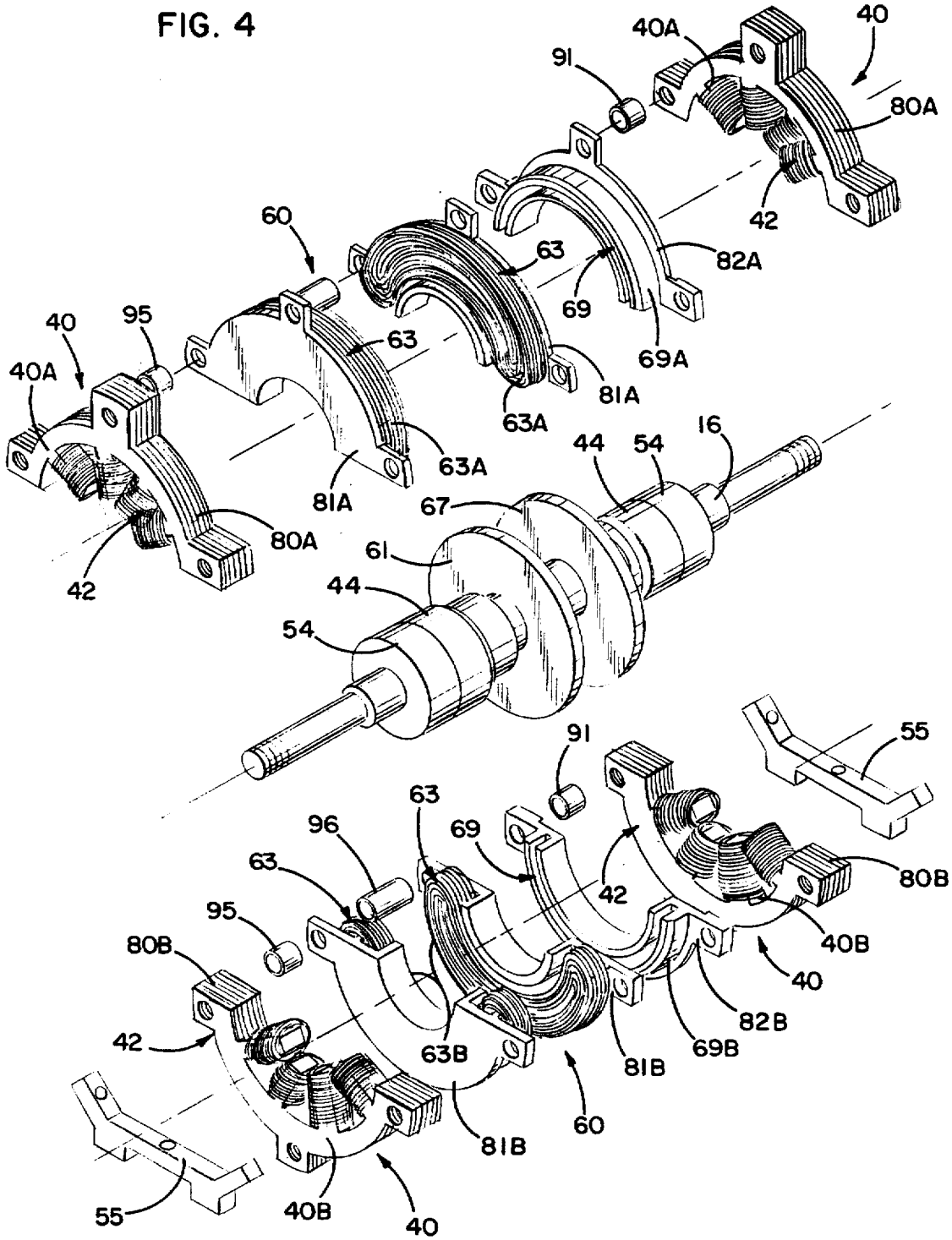
FIG. 4 is an exploded perspective view of the shaft and the magnetic bearings.

In some air cycle machines, an additional disc 67 (FIGS. 2 and 4) is fixed to and projects radially from the shaft 16 adjacent the disc 61 and coacts with an annular and axially facing permanent magnet 69 fixed to the housing 15. The permanent magnet 69 is located at the side of the disc 67 adjacent the compressor 17 and exerts a constant force biasing the shaft axially toward the compressor in order to offset the axial force created as a result of the pressure differentials from the compressor to the turbine 18. The permanent magnet reduces the power required by the electromagnets 63 during rotation of the shaft.

Backup mechanical bearings are provided in order to support the shaft 16 when the shaft is stationary and also for a relatively short period of time (e.g., seven seconds maximum) in the event power to the electromagnets 42 is lost. In this instance, the backup bearings include stationary bushings 70 (FIG. 3) which are mounted in the end walls 71 and 72 of the housing 15. The bushings 70 support the end portions of the shaft.

As compared to air bearings, the use of the magnetic bearings 40 and 60 in the air cycle machine 10 offers several advantages. Running clearances in air bearings need to be held to approximately ±0.0002" whereas the running clearances permitted with respect to the magnetic bearings are a significantly more relaxed value of about ±0.005". The relatively large bearing clearance of the magnetic bearings results in less friction and heat. In addition, the relatively large clearance decreases the chances of the magnetic bearings being damaged by dirt or other contamination. The magnetic bearings are not subjected to damage during start up and shut down and this, when taken with the factors discussed above, significantly increases the service life of the bearings and significantly reduces maintenance costs. And, unlike air bearings, the magnetic bearings do not require use of bleed air from the line 12 for the purpose of cooling the bearings.

Further in accordance with the invention, the housing 15 and the bearings 40 and 60 are uniquely constructed to enable access to be gained to the shaft 16 and the interior of the housing for repair purposes without need of withdrawing the shaft axially out of the housing and the bearings. As a result, complete air cycle machine overhaul may be performed on location without sending the machine to a repair depot.

Figure 3:
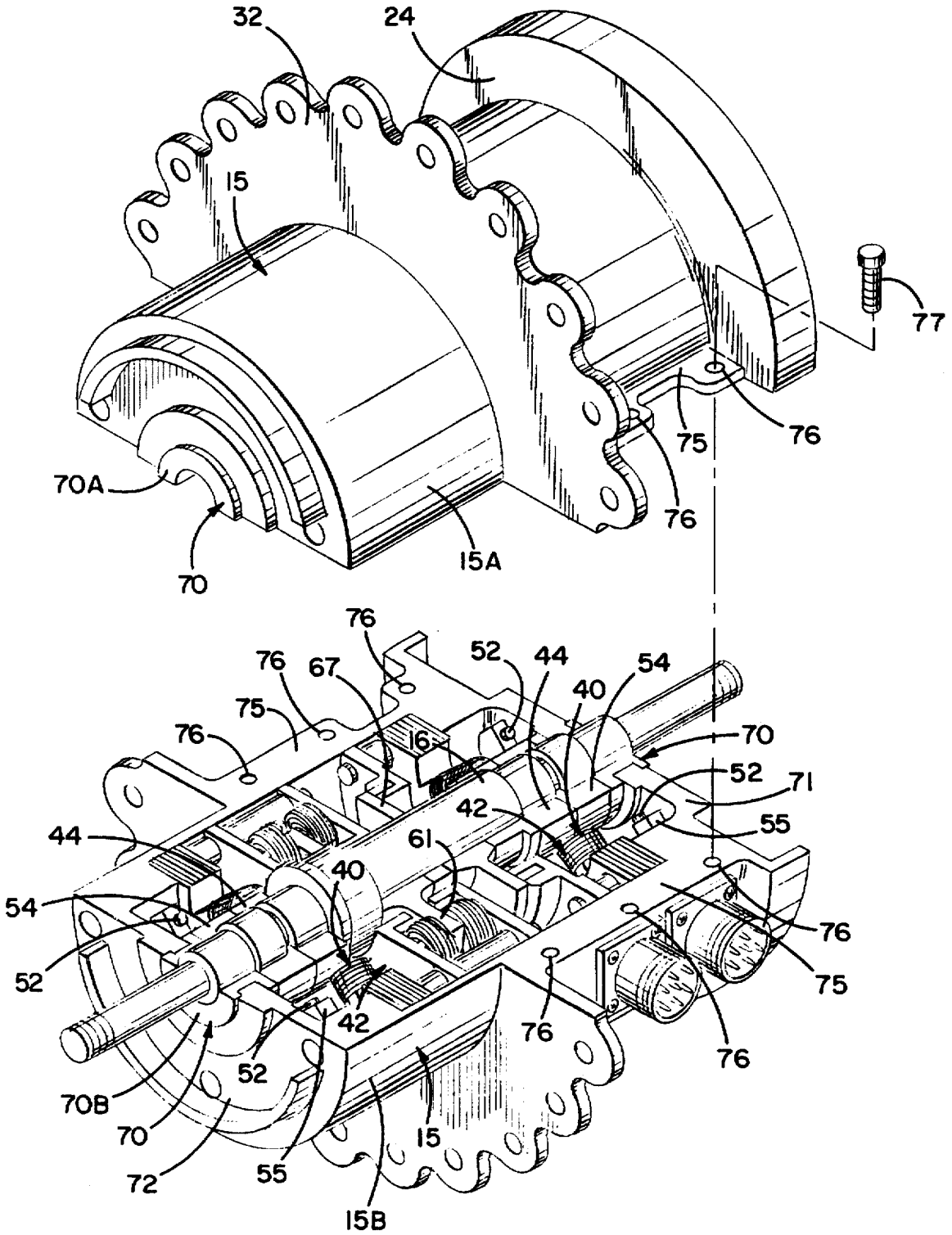
FIG. 3 is an enlarged exploded perspective view of the main housing of the air cycle machine.

Specifically, the foregoing is achieved by forming the housing 15 as a split assembly having two housing sections 15A and 15B (FIG. 3). The two housing sections are formed with mounting flanges 75 having holes 76 for receiving fasteners such as screws 77. When the housing sections are assembled on the shaft 16, the mounting flanges 75 of the housing section 15A are disposed in face-to-face engagement with the mounting flanges 75 of the housing section 15B, and the interface between the mating flanges lies in a plane which substantially coincides with a plane containing the axis of the shaft. The housing sections are held in assembled relation by virtue of the screws 77 extending through the holes 76 in the flanges 75. By removing the screws, either housing section may be removed from the shaft by pulling the housing section radially away from the shaft. Thus, the housing sections are like a clam shell and may be opened up to afford access to the shaft without need of withdrawing the shaft axially from the housing 15.

The bearings 40 and 60 and the bushings 70 also are of a clamshell nature in that the bearings and the bushings are split on the axis of the shaft 16 so as to permit radial disassembly of the housing sections 15A and 15B in the manner described above. As shown most clearly in FIG. 4, each of the radial bearings 40 is constructed as two split modules 40A and 40B, each module containing four electromagnets 42 and each having a generally semicircular mounting bracket 80A or 80B for supporting the electromagnets. Similarly, each axially spaced component of the thrust bearing 60 is constructed as two split modules 63A and 63B having generally semicircular mounting brackets 81A and 81B, respectively. Each module of each axially spaced component of the thrust bearing contains an electromagnet.

The permanent magnet 69 also is constructed as two split modules 69A and 69B having semicircular mounting brackets 82A and 82B. Finally, the stationary portions of the backup bushings 70 are in the form of two radially split halves 70A and 70B (FIG. 3).

The various modules described above are supported in the respective housing sections 15A and 15B. By way of example and as shown most clearly in FIG. 2, angularly spaced screws 90 extend through the end wall 71 of the housing section 15A, through the mounting bracket 80A for the adjacent radial bearing module 40 and through the mounting bracket 82A for the permanent magnet module 69 in order to attach the mounting brackets to the housing section. Bushings 91 on the screws are sandwiched between the brackets 80A and 82A to hold the latter in axially spaced relation.

Angularly spaced screws 94 (FIG. 2) extend through the end wall 72 of the housing section 15A, through the mounting bracket 80A for the adjacent radial bearing module 40 and through the mounting brackets 81A of the thrust bearing modules 63, thereby securing those components within the housing section. A bushing 95 holds the bracket 80A in axially spaced relation with the adjacent bracket 81A while a bushing 96 establishes a fixed axial spacing between the two brackets 81A.

The various components in the housing section 15B are supported in a manner similar to that described above.

With the foregoing arrangement, access may be gained to the shaft 16 and to the compressor and turbine rotors 19 and 26 in a relatively simple manner. First, the screws 25 and 30 are removed to enable the compressor and turbine casings 22 and 28 to be slipped axially away from the housing 15. Thereafter, the screws 77 are removed to allow the housing section 15A and the bearing modules therein to be pulled radially away from the shaft 16 and the housing section 15B as shown in FIG. 3 or, alternatively, to allow the housing section 15B and its bearing modules to be pulled radially in the opposite direction away from the shaft and the housing section 15A. In either case, the shaft 16 with the attached compressor and turbine rotors 19 and 26 then may be removed radially from the exposed housing section. This allows maintenance such as replacing the bearings 40 or 60, the bushings 70 or the shaft 16 to be accomplished in a relatively easy manner. For example, the shaft may be simply lifted out of the open housing section and replaced with a previously balanced shaft rather than sending the entire machine 10 to a repair depot having specialized equipment for removing a shaft axially from bearings. Moreover, the final balancing of the shaft may be performed while the rotors 19 and 26 are installed on the shaft so as to improve the balance of the overall rotating assembly.

We claim:

1. An air cycle machine for an aircraft and comprising a housing, a shaft disposed in said housing and having a central axis, a compressor mounted on said shaft and having inlet means for receiving a pressurized gas to be compressed, a turbine mounted on said shaft in axially spaced relation with said compressor and having inlet means for receiving gas pressurized by said compressor, said turbine being driven by the gas pressurized by said compressor and acting through said shaft to drive said compressor, the pressurized gas received by said turbine expanding therein, being cooled as a result of expanding and being exhausted as chilled gas by said turbine, axially spaced bearings for radially supporting said shaft for rotation in said housing, each of said bearings comprising a plurality of electromagnets mounted within said housing and spaced angularly around said shaft, said electromagnets comprising selectively energizable electrical coil means for producing magnetic forces suspending said shaft radially within said housing, means for sensing the radial position of the axis of said shaft, means responsive to said sensing means for varying the energization of said coils to keep the axis of said shaft in coincidence with a predetermined axis, an additional bearing for maintaining said shaft in a predetermined axial position in said housing, said additional bearing comprising axially spaced and axially opposing electromagnets mounted within said housing and positioned substantially coaxial with said shaft, a disc rigid with and projecting radially from said shaft and located between said axially opposing electromagnets, said axially opposing electromagnets comprising selectively energizable electrical coil means for producing magnetic forces acting in axially opposing relation on said disc, means for detecting the axial position of said shaft, means responsive to said detecting means for varying the energization of the coils of said axially opposing electromagnets to keep said shaft in a predetermined axial position, a second disc rigid with [an] *and* projecting radially from said shaft, and annular permanent magnet means disposed in said housing in axially opposing relation with said second disc for producing a magnetic force biasing said second disc and said shaft axially in opposition to the pressurized gas entering said inlet means of said compressor.

2. An air cycle machine comprising a housing, a shaft disposed in said housing and having a central axis, said housing comprising first and second sections having mounting flanges mating with one another in a plane substantially coinciding with a plane containing said axis, axially spaced bearings for radially supporting said shaft for rotation in said housing, each of said bearings comprising first and second groups of electromagnets mounted in said first and second housing sections, respectively, and spaced angularly around said shaft, said electromagnets comprising selectively energizable electrical coil means for producing magnetic forces suspending said shaft radially within said housing, and connecting means for releasably securing said flanges to one another whereby said housing may be removed from said shaft by releasing said connecting means, by pulling said first housing section and said first group of electromagnets as a unit radially in one direction away from said shaft, and by pulling said second housing section and said second group of electromagnets as a unit radially in the opposite direction away from said shaft.

3. An air cycle machine as defined in claim 2 in which one-half of the electromagnets of each bearing are mounted in one housing section, the other one-half of the electromagnets of each bearing being mounted in the other housing section.

4. An air cycle machine as defined in claim 2 further including an additional bearing for maintaining said shaft in a predetermined axial position in said housing, said additional bearing comprising axially spaced and axially opposing electromagnets, a disc rigid with and projecting radially from said shaft and located between said axially opposing electromagnets, said axially opposing electromagnets comprising selectively energizable electrical coil means for producing magnetic forces acting in opposing relation on said disc, each of said axially opposing electromagnets including first and second electromagnets mounted in said first and second housing sections, respectively, and connected to the respective housing section to be pulled radially away from said shaft as a unit with the respective housing section.

5. An air cycle machine for an aircraft and comprising a housing, a shaft disposed in said housing and having a central axis, a compressor mounted on said shaft and having inlet means for receiving a pressurized gas to be compressed, a turbine mounted on said shaft in axially spaced relation with said compressor and having inlet means for receiving gas pressurized by said compressor, said turbine being driven by the gas pressurized by said compressor and acting through said shaft to drive said compressor, the pressurized gas received by said turbine expanding therein, being cooled as a result of expanding and being exhausted as chilled gas by said turbine, axially spaced bearings for radially supporting said shaft for rotation in said housing, each of said bearings comprising a plurality of electromagnets mounted within said housing and spaced angularly around said shaft, said electromagnets comprising selectively energizable electrical coil means for producing magnetic forces suspending said shaft radially within said housing, means for sensing the radially position of the axis of said shaft, means responsive to said sensing means for varying the energization of said coils to keep the axis of said shaft in coincidence with a predetermined axis, said housing comprising two sections having mounting flanges mating with one another in a plane substantially coinciding with a plane containing said predetermined axis, and connecting means for releasably securing said flanges to one another whereby said housing may be removed from said shaft by releasing said connecting means and pulling said housing sections radially in opposite directions away from said shaft, some of the electromagnets of each bearing being mounted within one of said housing sections, the remaining electromagnets of each bearing being mounted in the other of the housing sections whereby the electromagnets in each housing section are pulled radially away from said shaft when the housing section is pulled radially away from the shaft.

6. An air cycle machine as defined in claim 5 in which one-half of the electromagnets of each bearing are mounted in one housing section, the other one-half of the electromagnets of each bearing being mounted in the other housing section.

*7. A machine comprising a housing, a shaft disposed in said housing and having a central axis, said housing comprising first and second sections mating with one another in a plane substantially coinciding with a plane containing said axis, axially spaced bearings for radially supporting said shaft for rotation in said housing, each of said bearings comprising first and second groups of electromagnets mounted in said first and second housing sections, respectively, and spaced angularly around said shaft, said electromagnets comprising selectively energizable electrical coil means for producing magnetic forces suspending said shaft radially within said housing, and connecting means for releasably securing said sections to one another whereby said housing may be removed from said shaft by releasing said connecting means, by pulling said first housing section and said first group of electromagnets as a unit radially in one direction away from said shaft, and by pulling said second housing section and said second group of electromagnets as a unit radially in the opposite direction away from said shaft.*

*8. A machine as defined in claim 7 further including means for sensing the radial position of the shaft, and means responsive to the sensing means for varying the energization of said coils to keep the axis of said shaft in coincidence with a predetermined axis.*

*9. A machine as defined in claim 8 in which one-half of the electromagnets of each bearing are mounted in one housing section, the other one-half of the electromagnets of each bearing being mounted in the other housing section.*

*10. A machine as defined in claim 8 further including an additional bearing for maintaining said shaft in a predetermined axial position in said housing, said additional bearing comprising axially spaced and axially opposing electromagnets, a disc rigid with and projecting radially from said shaft and located between said axially opposing electromagnets, said axially opposing electromagnets comprising selectively energizable electrical coil means for producing magnetic forces acting in opposing relation on said disc, each of said axially opposing electromagnets including first and second electromagnets mounted in said first and second housing sections, respectively, and connected to the respective housing section to be pulled radially away from said shaft as a unit with the respective housing section.*

* * * * *